United States Patent
Canestri et al.

(10) Patent No.: US 9,873,532 B2
(45) Date of Patent: Jan. 23, 2018

(54) METHOD, APPARATUS, AND MACHINE FOR FILLING BAGS WITH A METERED QUANTITY OF BULK MATERIAL

(71) Applicant: Concetti S.p.A., Bastia Umbra (IT)

(72) Inventors: Paolo Canestri, Bastia Umbra (IT); Gianni Ceccacci, Bastia Umbra (IT); Teodoro Concetti, Bastia Umbra (IT)

(73) Assignee: Concetti S.p.A.

( * ) Notice: Subject to any disclaimer, the term of this patent is extended or adjusted under 35 U.S.C. 154(b) by 484 days.

(21) Appl. No.: 14/579,173

(22) Filed: Dec. 22, 2014

(65) Prior Publication Data
US 2015/0183537 A1 Jul. 2, 2015

(30) Foreign Application Priority Data
Dec. 27, 2013 (IT) .......................... MI2013A002210

(51) Int. Cl.
*B65B 37/18* (2006.01)
*B65B 43/56* (2006.01)
(Continued)

(52) U.S. Cl.
CPC ................ *B65B 37/18* (2013.01); *B65B 1/02* (2013.01); *B65B 1/22* (2013.01); *B65B 1/32* (2013.01);
(Continued)

(58) Field of Classification Search
CPC .... B65B 1/02; B65B 1/06; B65B 1/22; B65B 1/26; B65B 1/28; B65B 1/32; B65B 1/36;
(Continued)

(56) References Cited

U.S. PATENT DOCUMENTS 1,826,926 A * 10/1931 Cundall .................... B65B 1/22
141/179
2,194,633 A * 3/1940 Bemis ..................... B65B 37/00
141/105
(Continued)

FOREIGN PATENT DOCUMENTS

DE 9304049 U1 * 7/1994
EP 0043875 A1 1/1982
(Continued)

*Primary Examiner* — Stephen F Gerrity
(74) *Attorney, Agent, or Firm* — Mintz Levin Cohn Ferris Glovsky and Popeo, P.C.

(57) ABSTRACT

A method for filling bags with metered quantities of bulk products includes providing a first container and a second container having an assigned total volume. Each container is divided into two respective half-volumes, each half-volume being designed to feed product to a first station or a second station for filling bags, so that each container has a half-volume connected to the first station and a half-volume connected to the second station of the two stations. A first predefined metered quantity of product is provided inside the first container by dividing-up the metered quantity of product into two quantities equal to approximately half the metered quantity, each fed to a respective half-volume of the first container. A bag is conveyed to the first filling station. The bag is filled with the quantity of product of the first half volume of the first container.

19 Claims, 5 Drawing Sheets

(51) Int. Cl.
  *B65B 1/36*   (2006.01)
  *B65B 1/32*   (2006.01)
  *G01G 15/00*  (2006.01)
  *G01G 13/18*  (2006.01)
  *B65B 1/06*   (2006.01)
  *B65B 1/02*   (2006.01)
  *B65B 1/22*   (2006.01)
  *B65B 51/14*  (2006.01)

(52) U.S. Cl.
  CPC ............. *B65B 1/36* (2013.01); *B65B 43/56* (2013.01); *B65B 1/06* (2013.01); *B65B 51/146* (2013.01); *G01G 13/18* (2013.01); *G01G 15/001* (2013.01)

(58) Field of Classification Search
  CPC ........ B65B 37/00; B65B 37/02; B65B 37/18; G01G 13/18; G01G 13/244; G01G 15/001; G01G 19/32; G01G 19/393
  USPC ........ 53/434, 436, 437, 459, 469, 512, 525, 53/527, 570, 240, 284.7; 141/103; 177/91
  See application file for complete search history.

(56) References Cited

U.S. PATENT DOCUMENTS

| | | | | |
|---|---|---|---|---|
| 2,366,811 A * | 1/1945 | Sibson, Jr. et al. | ....... | B65B 1/36 141/101 |
| 2,548,222 A * | 4/1951 | Kindseth | ........ | B65B 1/22 141/103 |
| 2,712,406 A * | 7/1955 | Kindseth | ........ | B65B 1/22 141/180 |
| 2,727,669 A * | 12/1955 | Sackett | ........ | B65B 1/32 141/234 |
| 3,045,720 A * | 7/1962 | Jungmayr et al. | ...... | B65B 39/14 141/135 |
| 3,152,622 A * | 10/1964 | Rothermel | ........ | B65B 39/14 141/134 |
| 4,074,507 A * | 2/1978 | Ruf et al. | ........ | B65B 1/34 141/103 |
| 4,287,703 A * | 9/1981 | Henle et al. | ........ | B65B 43/54 493/100 |
| 4,325,418 A * | 4/1982 | Henle | ........ | B65B 39/12 141/103 |
| 4,753,306 A * | 6/1988 | Mosher | ........ | G01G 19/393 177/25.19 |
| 4,959,947 A * | 10/1990 | Reif | ........ | B65B 1/32 141/103 |
| 4,967,856 A * | 11/1990 | Kawanishi et al. | . | G01G 19/393 177/1 |
| 5,054,274 A * | 10/1991 | Tanaka | ........ | B65B 39/00 141/90 |
| 5,626,004 A * | 5/1997 | Gates et al. | ........ | B65B 37/02 141/114 |
| 5,651,401 A * | 7/1997 | Cados | ........ | B65B 1/36 141/103 |
| 6,321,506 B1 * | 11/2001 | Rolland | ........ | A47J 31/404 53/53 |
| 2003/0089421 A1 | 5/2003 | Hill | | |
| 2011/0079448 A1 | 4/2011 | Almberg | | |

FOREIGN PATENT DOCUMENTS

| | | | | |
|---|---|---|---|---|
| EP | 1174693 A2 | 1/2002 | | |
| EP | 1459981 A1 | 9/2004 | | |
| FR | 352544 A * | 8/1905 | ............... | B65B 1/02 |
| FR | 794958 A * | 2/1936 | ............... | B65B 1/02 |
| GB | 437690 A * | 11/1935 | ............... | B65B 1/06 |
| GB | 786441 A * | 11/1957 | ............... | B65B 1/06 |
| GB | 869321 A * | 5/1961 | ............... | B65B 1/06 |
| GB | 2027412 A * | 2/1980 | ............ | B65B 37/00 |
| JP | 58223718 A * | 12/1983 | ........... | G01G 19/393 |

* cited by examiner

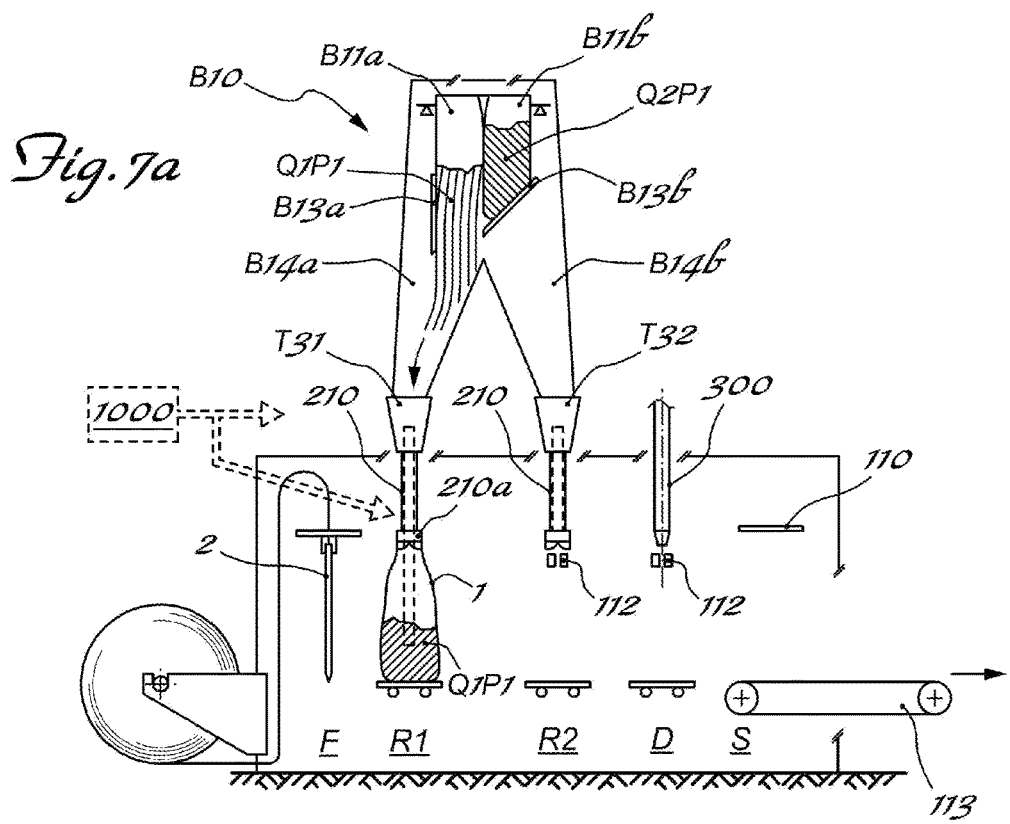
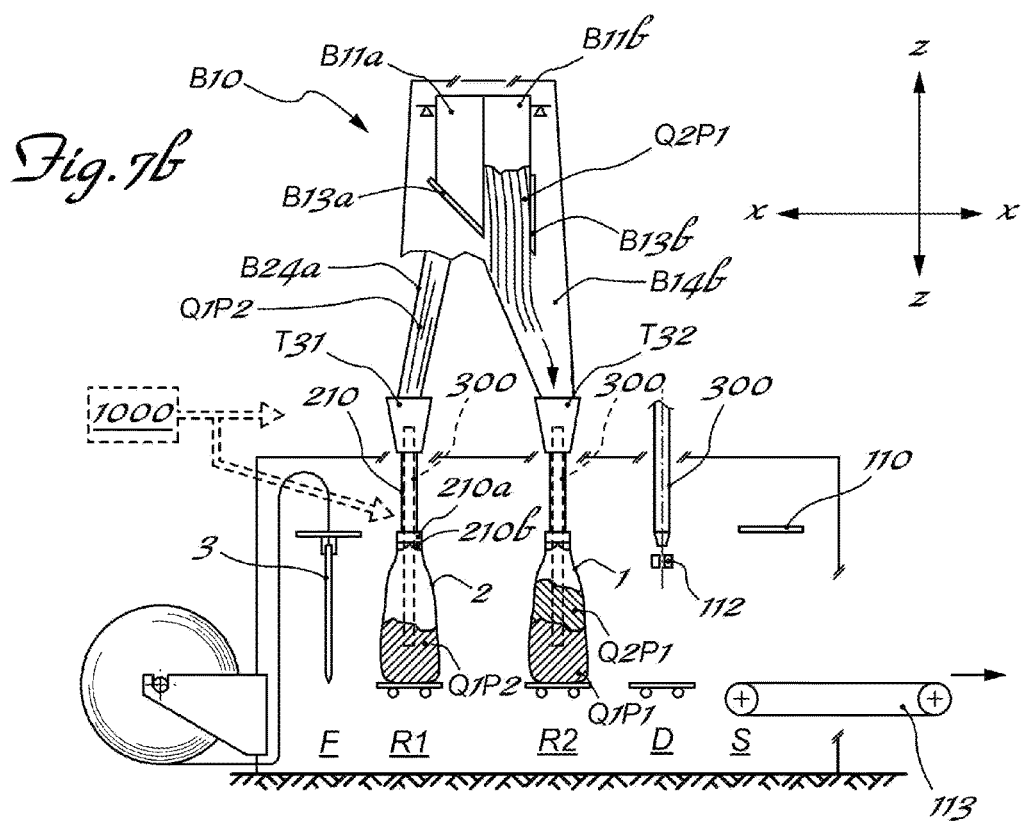

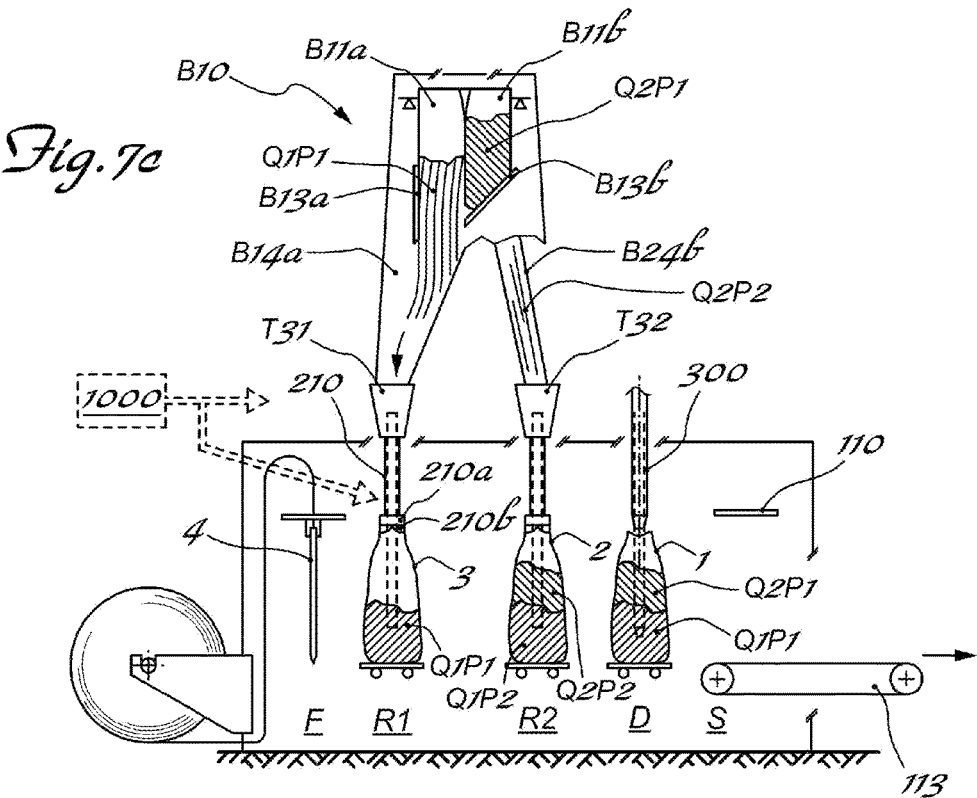
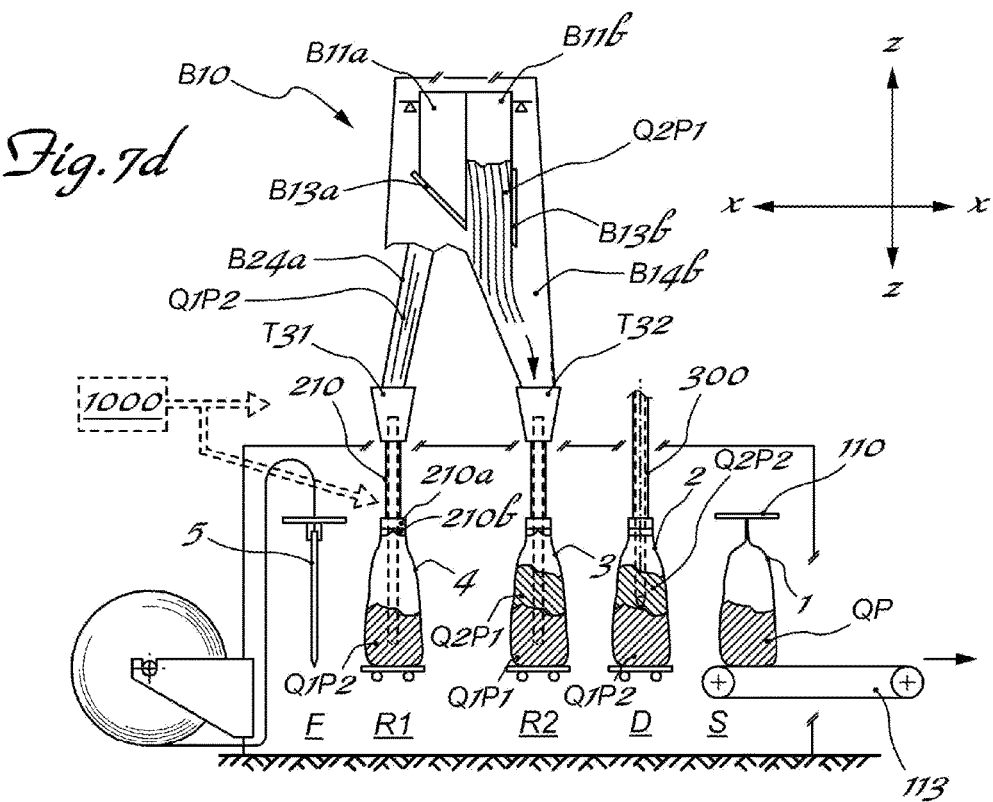

METHOD, APPARATUS, AND MACHINE FOR FILLING BAGS WITH A METERED QUANTITY OF BULK MATERIAL

CROSS-REFERENCE TO RELATED APPLICATION

This application claims priority to Italian Patent Application No. MI2013A002210 filed on Dec. 27, 2013, the contents of which are hereby expressly incorporated by reference herein.

TECHNICAL FIELD

The present subject matter relates to filling bags with a metered quantity of bulk material. Related apparatus, systems, techniques, and articles are also described.

BACKGROUND

It is known in the product sector relating to the packaging of bulk material that there exists the need to introduce said material inside bags, which must be filled with a given and precisely defined quantity of material and then sealed. It is also known that, for this purpose, automatic bag filling machines have been developed, an example of said machines consisting of so-called form, fill and seal machines, which are able to perform at high speed the cycle of forming the bag, filling the bag and final sealing of the bag mouth. These machines comprise in particular a station for filling the bag with the product contained inside a hopper arranged in a position substantially coaxial with the bag itself and higher than the level of the bag mouth, said quantity of filling product being able to be determined substantially using three main methods referred to as follows: a net-weight method (i.e., involving weighing the product before it is introduced into the bag); a gross-weight method (i.e., involving weighing the product together with the filling bag; and a volumetric method (i.e., where a predefined volume of product is prepared independently of the measurement of its overall weight).

Machines of this type, which are known for example from EP 0,595,778 in the name of the same present Applicant, comprise a bag filling step which is performed by allowing the product to fall by means of gravity inside the bag, which is filled with given quantities determined using one of the aforementioned metering methods. FIGS. 1 and 2 show a form fill seal (FFS) machine with a forming station F, a filling station R with fixed grippers for gripping the bag engaged with the product feed mouth, which station is provided with rotating valves 210 able to open and close; a station S for sealing the bag mouth and a conveyor 113 for conveying out of the machine the filled and sealed bag; FIG. 2 also shows in schematic form the working sequence performed by means for conveying the bag from one station to another with opening of the mouth, closing of the mouth after filling, and sealing of the mouth with release of the grippers.

Although fulfilling its intended function, this bag filling operation, which is performed in a single step, involves a number of problems due to the fact that the falling movement of the product generates a large quantity of dust, which tends to spread outwards, being dispersed in the environment or resulting in the need to use costly suction devices. In addition, with single-step filling, a large amount of air is also introduced into the bag and must be expelled to allow correct filling with the correct metered quantity of material.

In addition to this, products such as cement products, finely ground calcium carbonates, powder milk, starches and the like have the characteristic feature that they increase in volume by more than 50% in terms of their own particular weight unit, owing to the air, which is trapped between the molecules of material. These products inside the bags, if not suitably treated, have a high instability and consequently require specific treatment for reduction of their volume and palletization so that they are ready for commercial distribution. In addition, it is also mentioned that a suitable compaction of the volume of product introduced into the bag results in a reduction of the material needed for packaging, thereby reducing the final cost and the impact on the environment.

In order to perform the packaging of these materials, auxiliary mechanisms such as vibrators and porous suction probes are used, these being designed to remove the air from the material already introduced into the bag and being installed on automatic machines, such as the abovementioned FFS machines for forming, filling and sealing the bag.

In addition to the above, a further problem is mentioned, i.e., that due to the fact that the apparatus for metering the product to be filled inside the bags are always affected by a certain degree of uncertainty with regard to the measurement operation. In fact, in the case of net-weight weighing, the quantity of product actually present inside the bag is approximate, with consequent weighing errors.

SUMMARY

One technical problem posed is that of solving or at least mitigating the cited problems of the prior art. In particular, a problem posed is that of providing an apparatus and a machine for filling bags with bulk material, in particular materials whose volume increases owing to the intramolecular air trapped during filling, which are able to fill the bag at high speed and with a precisely defined quantity of product, such that the high hourly production rates may be maintained and the precautionary measures required by the modern-day industry in question are complied with. In connection with this problem it is also required that this apparatus should have compact dimensions, be easy and inexpensive to produce and assemble and be able to be installed easily at any user location using normal standardized connection means.

These results are obtained according to the present subject matter by a method for filling bags with a metered quantity of bulk material according to features described herein, an apparatus for implementing the method as described herein and an automatic filling machine provided with this apparatus as described herein.

Therefore, according to a first aspect, the subject matter relates to a method of filling bags 1 with metered quantities QP of bulk products P1;P2, comprising the following steps:
a) providing a first container B11 and a second container B21 having an assigned total volume;
b) dividing up each container B11;B21 into two respective half-volumes B11a,B11b;B21a,B21b, each half-volume being designed to feed product to a first station R1 or a second station R2 for filling bags 1, so that each container has one half-volume connected to the first station R1 and one half-volume connected to the second station R2 of the two stations R1;R2;
c) providing a first predefined metered quantity QP of product P1 inside the first container B11 by dividing up the metered quantity QP of product into two quantities Q1P1,Q2P1 equal to approximately half the metered quantity, each fed to a respective half-volume B11a, B11b of the first container B11;

d) conveying a bag 1 to the first filling station R1;

e) filling the filling bag 1 with the quantity Q1P1 of product of the first half-volume B11a of the first container B11;

f) providing a second predefined metered quantity QP2 of product P2 inside the second container B21, dividing up the metered quantity QP2 of product into two quantities Q1P2,Q2P2 equal to approximately half the metered quantity, each fed to a respective half-volume B21a,B21b of the second container B21;

g) moving the bag 1 to the second filling station R2;

h) filling the bag 1 with the quantity Q2P1 of product contained in the second half volume B11b of the same first container B11;

i) conveying a second bag 2 to the first filling station R1;

j) filling the second bag 2 with the quantity Q1P2 of product P2 supplied from the first half-volume B21a of the second container B21;

k) moving the second bag 2 to the second station R2;

l) filling the second bag 2 with the second quantity of product Q2P2 supplied from the second half-volume B21b of the same second container B21;

m) feeding a new metered quantity of product P1 to the first container B11 with subdivision into the two half-volumes B11a, B11b for a further dispensing cycle;

n) conveying the first bag 1 to a sealing station S) and from here to the exit 113;

o) continuing the cycle with the steps c-n for the second or following bags.

At each filling station, it may be envisaged a deaeration and compaction of the product contained in the bag. The method may envisage a further step of deaeration D of the product filled inside the bag, downstream of the second filling station. The metered quantity of product fed to each of the two containers B11,B21 may be metered using a volumetric method or with net-weight metering, in the latter case the containers B11,B21 can be associated with weighing means, forming overall two scales B10,B20.

According to some embodiments, the bags conveyed to the filling stations R1,R2 are formed from a tubular material inside a form, fill and seal (FFS) machine. Alternatively the bags conveyed to the filling stations R1,R2 may be preformed and removed from a store associated with the filling machine.

According to a further and interrelated aspect, the present subject matter is relative to an apparatus for feeding metered quantities QP of bulk product P1,P2 for filling bags 1, that comprises:

a first hopper T31 and a second hopper T32 connected to a respective bag-holder device for a bag 1 to be filled;

a first container B11 divided up into two halves so as to form two independent half-volumes B11a;B11b with a capacity approximately equal to half the total capacity of the container; each half-volume B11a;B11b being able to be opened/closed B13a,B13b for dispensing/intercepting the product Q1P1;Q2P1 contained inside it;

a second container B21 divided up into two halves so as to form two independent half-volumes B21a,B21b with a capacity approximately equal to half the total capacity of the container; each half-volume being able to be opened/closed for dispensing/intercepting the product Q1P2;Q2P2 contained inside it;

each half-volume B11a,B11b,B21a,B21b is connected at the bottom to a respective duct B14a,B14b,B24a,B24b, the first hopper T31 being connected to the first half-volume B11a of the first container B11 and to the first half-volume B21a of the second container via the respective ducts B14a,B24a, the second hopper T32 being connected to the second half-volume B11b of the first container B11 and to the second half-volume B21b of the second container B21 via the respective ducts B14b,B24b.

Each half-volume can extend vertically and can be divided from the other half-volume of therespective container by means of a vertical partition B12,B22. Each hopper T31,T32 can be connected at the bottom to a respective tube 210 for connection to a bag-holder device 212 provided with valves 212a rotatable from a closed position into an open position and vice versa.

In some implementations, an apparatus may comprise means for volumetric metering of the quantity of product fed to the two containers B11,B21. An apparatus may comprise means for net-weight metering of the quantity of product fed to each container B11,B21, said net-weight metering means are preferably associated with the containers B11,B21, forming overall two scales B10,B20.

A further aspect of the present subject matter relates to a machine for filling bags 1 with a metered quantity of bulk products P1;P2 comprising:

at least one first station R1 and one second station R2 for filling bags 1, arranged in cascade along the longitudinal direction X-X of advancing movement of the bag 1, at least one station S for sealing the bag 1a and a bag exit station 113, means 110,111 for conveying the bag from one station to the other, provided with devices for gripping, opening and closing the mouth of the bag, wherein the at least two filling stations R1,R2 comprise a metering apparatus 200 means 110,111 for conveying the bag from one station to the other, provided with devices for gripping, opening and closing the mouth of the bag, wherein the at least two filling stations R1,R2 comprise a metering apparatus 200 for feeding predefined metered quantities of product P1,P2 to each bag 1 for feeding predefined metered quantities of product P1,P2 to each bag 1.

The filling stations R1,R2 can have means 300 for deaeration and means 400 for vibration and compaction of the product contained in the bag. The machine according to the present subject matter can be a form, fill and seal (FFS) machine wherein bags are formed along the line from a tubular material 101, or a filling machine with bags preformed and removed from a store associated with the said machine.

Aspects of the present subject matter result particularly advantageous with products P1,P2 of the kind containing a large quantity of intramolecular air.

DESCRIPTION OF DRAWINGS

Further details may be obtained from the following description of a non-limiting example of embodiment of the present subject matter, provided with reference to the accompanying drawings, in which:

FIGS. 7a-7d are schematic side views of the working sequence of the machine according to the present subject matter.

DETAILED DESCRIPTION

Figure 1:
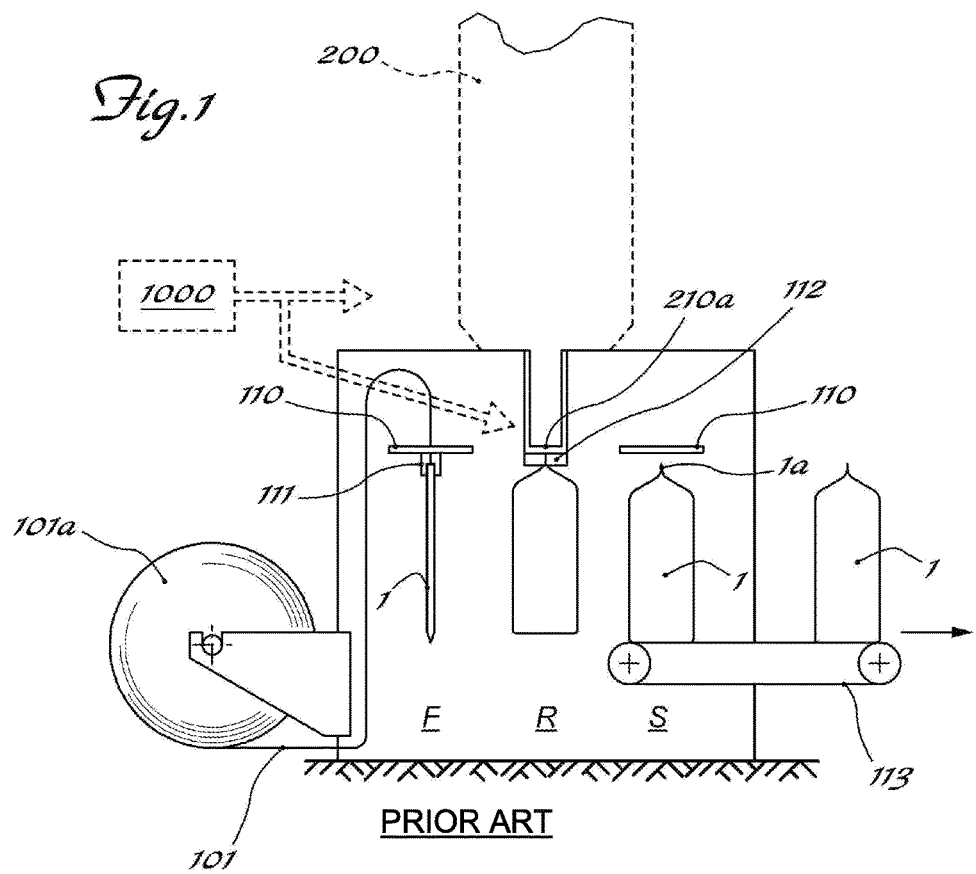
FIG. 1 is a schematic side view of a forming/filling machine with a filling apparatus according to the prior art.
Figure 2:
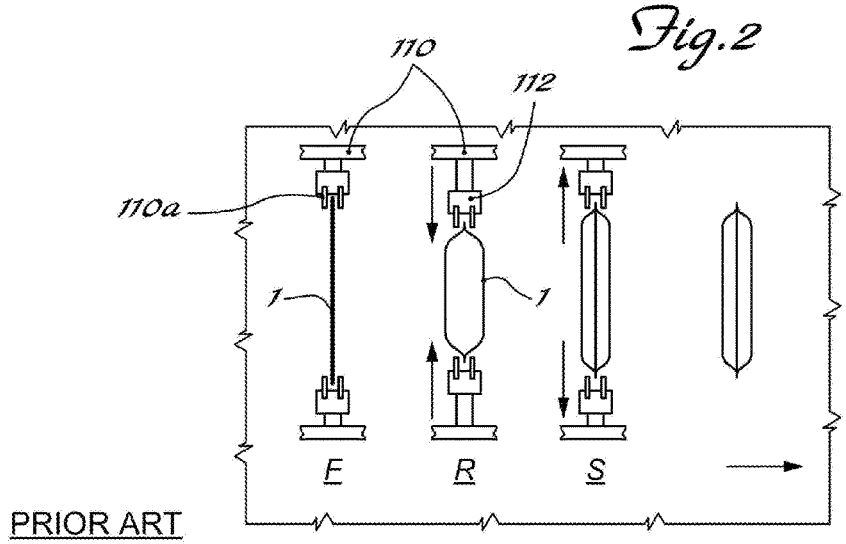
FIG. 2 is a schematic top plan view of the forming/filling machine according to FIG. 1.
Figure 3:
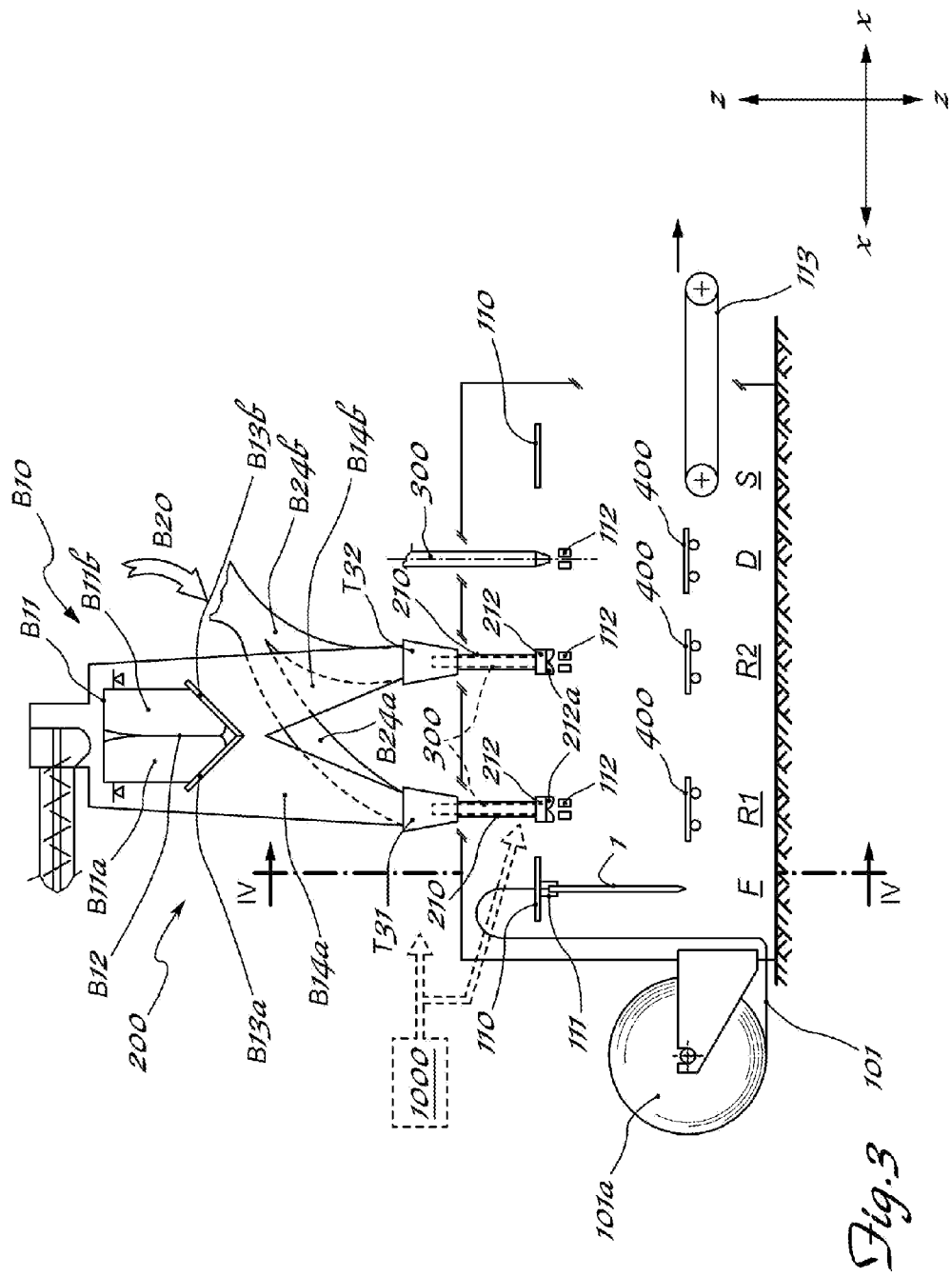
FIG. 3 is a schematic side view of a forming/filling machine with a filling apparatus according to the present subject matter.
Figure 4:
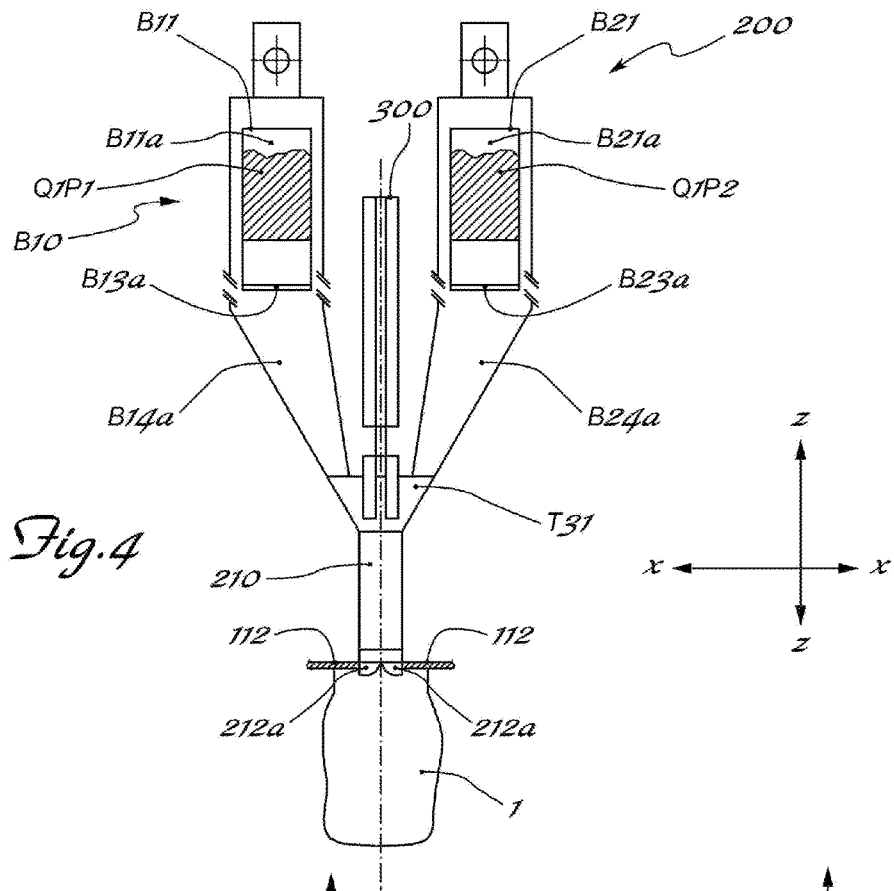
FIG. 4 is a schematic cross-section along the plane indicated by IV-IV in FIG. 3 with the apparatus during filling of the first bag.
Figures 5, 6:
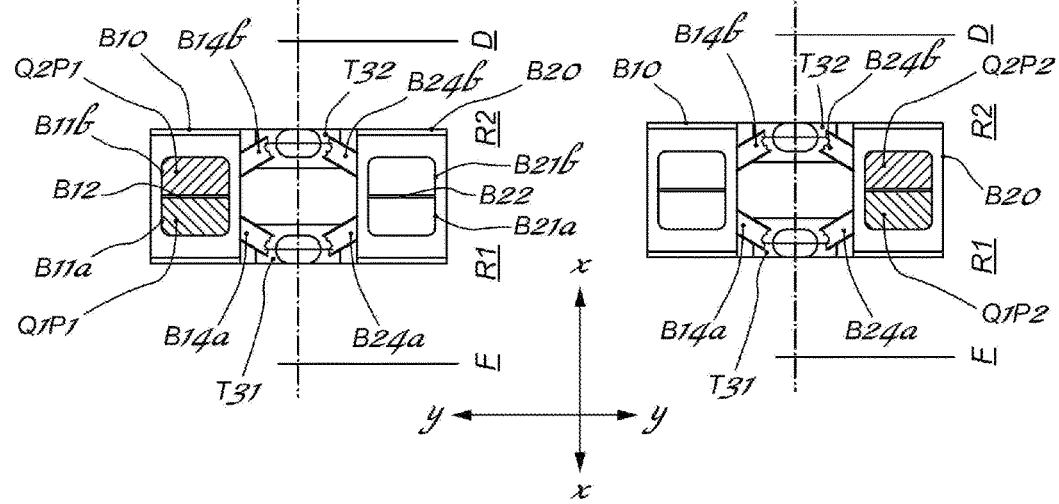
FIG. 5 is a schematic top plan view of the machine with first weighing and unloading scales.
FIG. 6 is a schematic top plan view of the machine with second weighing and unloading scales.

FIGS. 3 and 4 depict a first example of an FFS machine according to the present subject matter and that envisages metering of the product using the net-weight method. In these figures, solely for easier description and without any limiting meaning, a set of three reference axes are shown, wherein a longitudinal direction X-X corresponds to the direction of feeding of the bag inside the machine, a transverse direction Y-Y is perpendicular to the preceding direction and corresponds to the width of the machine and a vertical direction Z-Z is perpendicular to the other two directions. Also in these figures, a rear side may correspond to the entry side for the tubular material used to form a bag and a front side may correspond to the exit side for the filled bag.

In some embodiments, the FFS bag shown in FIGS. 3 and 4 may include:

a station F for forming the bag 1 from a tubular material 101 unwound from a reel 101a;

a first station R1 for filling the bag with the material supplied from the net-weight metering apparatus 200;

a second station R2 for filling the bag with the material supplied from a net-weight metering apparatus 200;

a station D for final deaeration of the product contained inside the filled bag and arranged downstream of the second filling station;

a station S for sealing the mouth 1a of the bag 1.

Conveying of the bag from one station to the other can be performed by means of a slide schematically indicated by 110 and provided with means 111 for gripping the bag, while conveying of the bag out of the machine is performed by means of a motor-driven belt or rollerway 113. Each filling station R1,R2 and deaeration station D is also provided with pairs of fixed grippers 112 of suitable dimensions for gripping the top part of the bag.

In detail, each filling station R1,R2 includes a respective hopper T31,T32 which has, connected to the bottom opening thereof, a tube 210 for connection to the bag tying device 212 arranged opposite the fixed grippers 112 and provided with valves 221a rotating from a closed position to an open position, and vice versa. Each hopper T31,T32 is connected at the top to the apparatus 200 for weighing and dispensing the product, which includes:

a first scales B10, the container B11 of which is divided up into two halves, B11a and B11b, respectively, preferably by a vertical partition B12, so as to form two independent half-volumes with a capacity equal to half the total capacity of the scales; each half-volume is closed at the bottom by a respective gate B13a,B13b which can be rotationally operated so as to open/close the respective half-volume and therefore dispense/intercept the quantity of product Q1P1,Q2P1 contained therein;

a second scales B20, the container B21 of which is similarly divided up into two halves, B21a and B21b respectively, preferably by a vertical partition B22, so as to form two independent half-volumes B21a and B21b with a capacity equal to half the total capacity of the scales; each half-volume is closed at the bottom by a respective gate B23a,B23b, which can be rotationally operated so as to open/close the half-volume and therefore dispense/intercept the product Q1P2,Q2P2 contained therein;

each half-volume B11a,B11b;B21a,B21b is connected at the bottom to a respective duct B14a,B14b,B24a,B24b connected to one of the two hoppers T31,T32 so that each hopper is respectively fed by a duct B14a or B14b from the first scales B1 and by a duct B24a or B24b from the second scales B20.

As shown, probes 300 for suction of the air may be provided in each filling station R1,R2 and in the deaeration station D, in order to reduce the volume of the product inside the bag. The three exemplary stations are also provided with vibration devices 400 arranged underneath the bag for compaction of the product before the bag is sealed.

Although the apparatus and the FFS machine have been described in connection with metering of the product performed using the net-weight method, it is envisaged that the scope of the present subject matter also includes apparatus and machines which meter the product by means of the volumetric method. In this case, since weighing may not be necessary, the two containers B11,B21 divided up into the four half-volumes B11a,B11b;B21a,B21b are formed as ordinary containers, since the quantity of product Q1P1, Q1P2,Q2P1,Q2P2 introduced into the respective half-volumes is determined with precision upstream thereof, on the basis of suitable devices. It is therefore clear that the two containers in this case do not have to be associated with weighing devices.

Programming and control means 1000 can be included for automated execution of the various operating steps.

With the apparatus configurations described above, the bag packaging machine operates in accordance with the steps of the following method (FIGS. 7a-7d):

a) the programmed metered quantity of the product P1 is prepared on the first scales B10 (FIG. 7a) by dividing the total quantity QP into two quantities Q1P1 and Q2P1 equal to approximately half the total quantity, dividing them up between the two volumes B11a and B11b of the first scales B10;

b) the cycle for forming the first bag 1 from the tubular material 101 is started;

c) the bag 1 is conveyed to the first filling station R1 where it is gripped by the fixed grippers 112;

d) filling of the bag 1 with the quantity of product Q1P1 in the first half-volume B11a of the first scales B10 is started, said product, following opening of the gate B13a, falls through the first duct B14a into the hopper T31 and from here into the bag 1;

e) at the same time the programmed metered quantity of the product P2 is prepared in the second scales B20 by dividing the total quantity QP2 into two quantities Q1P2 and Q2P2 each equal to approximately half the total quantity, dividing them up between the two half-volumes B21a and B21b of the second scales;

f) a second bag 2 is formed in the forming station F;

g) once the bag 1 has been filled with the first half of product Q1P1, the bag 1 is moved forwards to the second filling station R2;

h) once the bag 1 has been engaged with the bag-holder device 212 and the valves 212*a* opened, the gate B13*b* of the second half-volume B11*b* of the first scales B10 is opened and the second half Q2P1 is allowed to fall into the bag 1;

i) in the meantime a second bag 2 formed in the station F has been brought to the first filling station R1 where it is filled with the first half Q1P2 of the product P2 supplied from the first half-volume B21*a* of the second scales B20;

j) if required, the first bag 1 advances towards the deaeration and vibration station D in order to complete the reduction in volume and compaction of the product inside the bag;

k) the second bag 2 advances to the second filling station R2 where it is filled with the second half Q2P2 of product P2 supplied from the second half-volume B21*b* of the same second scales B20;

l) the bag 1 proceeds to the sealing station S and exit 113;

m) in the meantime new product P1 is supplied to the first scales B10 for a further weighing and dispensing cycle and the cycle for formation of a third successive bag 3 is started;

n) the third bag 3 which has been formed is conveyed to the first station R1 where it is filled with the first half Q1P1 of product of the first half-volume B10*a* of the scales B10; and o) the bags 2 and 3 complete their sealing and exit cycle 113 in a similar manner to that which occurs for the bag 1, while other bags 4 and 5 are respectively being formed and filled at the first station R1.

If required, deaeration may be completed in the deaeration and final compaction station D before the mouth 1*a* of the bag is sealed. If metering is performed using the volumetric method, the containers B11,B21 are not associated with weighing means. Although not illustrated, it is moreover envisaged that the method and the apparatus are also applicable to machines for which the bags are pre-formed and removed from a store associated with the filling machine instead of being formed along the line.

It is therefore clear how the method, the apparatus and the machine according to the present subject matter allow the filling of bags also with products whose volume increases owing to the intramolecular air, using a continuous cycle within machines of the FFS type or the like, with a substantial reduction in the downtime and a consequent increased hourly productivity compared to similar machines of the prior art, since:

filling of each bag with half the quantity at a time allows deaeration and compaction to be performed during filling much faster than the similar operations performed on a bag filled with the entire volume of product; and having available four half-volumes which alternately feed in pairs a same bag with a quantity supplied by a same metering operation allows continuous cycles to be performed without interruptions due to the need to wait for a subsequent metering operation before being able to start the subsequent filling a new bag.

A further advantageous factor of the method consists in the fact that there is only one product weighing operation, so that there is no risk of combined weighing errors and uncertain measurements performed by the two scales, and that the weighed product P1,P2 is inserted into the same bag from the same container B11, B21, with distribution of the dispensing operations in the two filling stations R1 and R2. This also avoids any risk of error during dividing up of the product being weighed between the two half-volumes of each container.

It is also envisaged that the method and the filling apparatus according to the present subject matter may be applied also to filling machines in which the bag is already formed and stacked in a store from where it is removed and conveyed directly to the mouth of the bag-holder device of the first filling station R1 from where the cycle already described starts. Although described in connection with a number of embodiments and a number of preferred examples of embodiment of the subject matter, it is understood that the scope of protection of the present patent is determined solely by the claims below.

The invention claimed is:

1. A method of filling bags with metered quantities of bulk products, the method comprising:
    providing a first container and a second container having an assigned total volume;
    dividing up each of the first container and the second container into two respective half-volumes, each half-volume being designed to feed product to a first filling station or a second filling station for filling bags, so that each of the first container and the second container has one half-volume connected to the first filling station and one half-volume connected to the second filling station;
    providing a first predefined metered quantity of product inside the first container by dividing up the metered quantity of product into two quantities equal to approximately half the metered quantity, each fed to a respective half-volume of the first container;
    conveying a first bag to the first filling station;
    filling the first bag with the quantity of product of the first half-volume of the first container;
    providing a second predefined metered quantity of product inside the second container, dividing up the metered quantity of product into two quantities equal to approximately half the metered quantity, each fed to a respective half-volume of the second container;
    moving the first bag to the second filling station;
    filling the first bag with the quantity of product contained in the second half volume of the first container;
    conveying a second bag to the first filling station;
    filling the second bag with the quantity of product supplied from the first half-volume of the second container;
    moving the second bag to the second filling station;
    filling the second bag with the second quantity of product supplied from the second half-volume of the second container;
    feeding a new metered quantity of product to the first container with subdivision into the two half-volumes for a dispensing cycle;
    conveying the first bag to a sealing station and from the sealing station to an exit;
    continuing the cycle for the second bag and any one or more additional bags.

2. The method according to claim 1, wherein deaeration and compaction of the product contained in each bag occurs at the first filling station and at the second filling station.

3. The method according to claim 1, further comprising deaerating the product filled inside each bag downstream of the second filling station.

4. The method according to claim 1, wherein the metered quantity of product fed to the first container and second container is metered using a volumetric method.

5. The method according to claim 1, wherein the metered quantity of product fed to the first container and second container is net-weight metered.

6. The method according to claim 5, wherein the first container and second container are associated with weighing means, forming overall two scales.

7. The method according to claim 1, wherein each bag conveyed to the first filling station and second filling station is formed from a tubular material inside a form, fill and seal (FFS) machine.

8. The method according to claim 1, wherein each bag conveyed to the first filling station and second filling station is pre-formed and removed from a store associated with a form, fill and seal (FFS) machine.

9. An apparatus for feeding metered quantities of bulk product for filling bags, the apparatus comprising:
a first hopper and a second hopper connected to a respective bag-holder device for a bag to be filled;
a first container divided into two independent half-volumes with a capacity approximately equal to half the total capacity of the first container, each half-volume being able to be opened and closed for dispensing and intercepting bulk product; and
a second container divided into two independent half-volumes with a capacity approximately equal to half the total capacity of the second container, each half-volume being able to be opened and closed for dispensing and intercepting bulk product;
wherein each half-volume of each of the first container and the second container is connected at the bottom to a respective duct, the first hopper being connected to the first half-volume of the first container and to the first half-volume of the second container via the respective ducts, the second hopper being connected to the second half-volume of the first container and to the second half-volume of the second container via the respective ducts.

10. The apparatus according to claim 9, wherein each half-volume of each of the first container and the second container extends vertically and is divided from the other half-volume of the respective container by means of a vertical partition.

11. The apparatus according to claim 9, wherein each of the first hopper and the second hopper is connected to a respective tube for connection to a bag-holder device provided with valves rotatable from a closed position into an open position, and vice versa.

12. The apparatus according to claim 9, further comprising means for volumetric metering of the quantity of bulk product fed to the first container and the second container.

13. The apparatus according to claim 9, further comprising means for net-weight metering of the quantity of bulk product fed to the first container and the second container.

14. The apparatus according to claim 13, wherein the net-weight metering means are associated with the first container and the second container, forming overall two scales.

15. A machine for filling bags with a metered quantity of bulk products, the machine comprising:
at least one first filling station and at least one second filling station for filling bags, arranged in cascade along a longitudinal direction of advancing movement of the bag;
at least one station for sealing each bag;
at least one bag exit station; and
conveying means for moving each bag from one station to another, the conveying means being provided with devices for gripping, opening and closing the mouth of each bag, wherein the at least first filling station and at least second filling station include a metering apparatus for feeding predefined metered quantities of bulk products to each bag, the metering apparatus comprising:
a first hopper and a second hopper connected to a respective bag-holder device for a bag to be filled;
a first container divided into two independent half-volumes with a capacity approximately equal to half the total capacity of the first container, each half-volume being able to be opened and closed for dispensing and intercepting bulk product; and
a second container divided into two independent half-volumes with a capacity approximately equal to half the total capacity of the second container, each half-volume being able to be opened and closed for dispensing and intercepting bulk product;
wherein each half-volume of each of the first container and the second container is connected at the bottom to a respective duct, the first hopper being connected to the first half-volume of the first container and to the first half-volume of the second container via the respective ducts, the second hopper being connected to the second half-volume of the first container and to the second half-volume of the second container via the respective ducts.

16. The machine according to claim 15, wherein the at least one first filling station and the at least one second filling station have means for deaeration and means for vibration and compaction of the product contained in the bag.

17. The machine according to claim 15, wherein the machine is a form, fill and seal (FFS) machine and wherein bags are formed along the line from a tubular material.

18. The machine according to claim 15, wherein the machine is a filling machine with bags pre-formed and removed from a store associated with the machine.

19. The machine according to claim 15, wherein the products are of the kind containing a large quantity of intramolecular air.

* * * * *